United States Patent
Lindgren et al.

(10) Patent No.: US 6,411,632 B2
(45) Date of Patent: Jun. 25, 2002

(54) NETWORK HUB FOR INTERCONNECTING A WIRELESS OFFICE ENVIRONMENT WITH A PUBLIC CELLULAR TELEPHONE NETWORK

(75) Inventors: Magnus Lindgren; Claes Wikström, both of Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/931,624

(22) Filed: Sep. 16, 1997

(51) Int. Cl.$^7$ ................ H04J 3/16; H04J 3/22
(52) U.S. Cl. ............. 370/466; 370/328; 370/410; 709/249; 455/422
(58) Field of Search ................ 370/410, 466, 370/467, 469, 328; 379/90.01, 93.31; 395/183.15, 285, 286, 831; 709/249; 455/422, 435, 410, 411

(56) References Cited

U.S. PATENT DOCUMENTS

| | | | |
|---|---|---|---|
| 5,594,795 A | | 1/1997 | Dent et al. |
| 5,621,727 A | * | 4/1997 | Vaudreuil .................. 370/271 |
| 5,629,978 A | * | 5/1997 | Blumhardt et al. ......... 370/271 |
| 5,638,431 A | * | 6/1997 | Everett et al. .............. 379/115 |
| 5,640,446 A | * | 6/1997 | Everett et al. .............. 379/115 |
| 5,661,790 A | * | 8/1997 | Hsu ............................ 379/209 |
| 5,732,213 A | * | 3/1998 | Gessel et al. ............. 395/200.54 |
| 5,740,230 A | * | 4/1998 | Vaudreuil .................. 379/88.22 |
| 5,740,231 A | * | 4/1998 | Cohn et al. ................ 379/88.22 |
| 5,761,201 A | * | 6/1998 | Vaudreuil .................. 370/392 |
| 5,771,275 A | * | 6/1998 | Brunner et al. ............ 379/230 |
| 5,774,695 A | * | 6/1998 | Autrey et al. .............. 395/500 |
| 5,793,771 A | * | 8/1998 | Darland et al. ............ 370/467 |
| 5,870,565 A | * | 2/1999 | Glitho ........................ 709/249 |
| 5,894,478 A | * | 4/1999 | Barzegar et al. ........... 370/401 |
| 5,905,719 A | * | 5/1999 | Arnold et al. .............. 370/330 |
| 5,933,784 A | * | 8/1999 | Gallagher et al. .......... 455/552 |
| 5,953,652 A | * | 9/1999 | Amin et al. ................ 455/410 |
| 5,991,617 A | * | 11/1999 | Powell ...................... 455/410 |
| 6,014,557 A | * | 1/2000 | Morton et al. ............. 455/410 |
| 6,058,422 A | * | 5/2000 | Ayanoglu et al. .......... 709/226 |
| 6,181,935 B1 | * | 1/2001 | Gossman et al. .......... 455/433 |

FOREIGN PATENT DOCUMENTS

EP     0 777 394 A1     4/1997

OTHER PUBLICATIONS

Sevcik, M. and Lueder, R., "Customers in Driver's Seat: Private Intelligent Network Control Point", ISS'95, Apr. 1995, vol. 2.
Fridh, Dan, M. Sc.E.E., "Mobitex Connectivity", Ericsson Mobile Communications, 1995.

* cited by examiner

*Primary Examiner*—David Vincent
*Assistant Examiner*—Bob A. Phunkulh
(74) *Attorney, Agent, or Firm*—Jenkens & Gilchrist, P.C.

(57) ABSTRACT

A network hub interconnects a public access cellular telephone network transceiving signals according to a SS7 protocol with a wireless office environment transceiving signals according to a TCP/IP protocol. The wireless office environment comprises a TCP/IP network interconnecting a plurality of private wireless networks. A processor within the hub converts received signals between being carried by the SS7 and TCP/IP protocols. The conversions are assisted by a translation table including active mobile identification numbers and IP addresses within the wireless office environment and a second table listing all signal point codes for nodes within the public access cellular telephone network.

23 Claims, 4 Drawing Sheets

NETWORK HUB FOR INTERCONNECTING A WIRELESS OFFICE ENVIRONMENT WITH A PUBLIC CELLULAR TELEPHONE NETWORK

BACKGROUND OF THE INVENTION

1. Technical Field of the Invention

The present invention relates to the interconnection of wireless office environments with a public cellular telephone network, and more particularly, to a network hub providing for transmission of messages from the hub to the public cellular telephone network using the SS7 protocol and the transmission of messages from the hub to the wireless office environment using the TCP/IP protocol.

2. Description of Related Art

Public access cellular telephone systems are currently available for use throughout the world. As a result of the success of such systems in providing mobile telecommunication services to the public, considerable interest has arisen in the corporate sector to provide a wireless communication feature add on to conventional private wireline telephone systems. Such a feature is typically implemented through the use of a private cellular telephone system.

Due to the costs of mobile terminals, it is preferable in any private cellular telephone system established by a business to utilize the same type of mobile terminals as are used within public access cellular telephone systems. Furthermore, because many employees already own mobile terminals and have subscriptions with a public access telephone system, it is preferable that the utilized mobile stations be capable of operating with and between each of the systems. At a minimum, this requires that the private cellular telephone system operate within the same cellular frequency band as the public access cellular telephone system, and use the same type or compatible switching equipment and base stations. It is also likely that the radio frequency coverage regions of the private cellular telephone system and the public access cellular telephone system may at least partially overlap. Furthermore, the private cellular telephone system and the public access cellular telephone system must communicate with each other regarding the servicing of mobile stations, the allocation of channels (frequencies) for communication, the routing of communications, and the handing off of mobile station communications.

It is preferred that the wireless offices be connected to an existing home location register (HLR) of the cellular network to enable automatic roaming between the cellular network and the wireless office. As the popularity of wireless offices increases, each new wireless offices must be connected to the signaling system no. 7 (SS7) network that forms the backbone of existing public access cellular telephone systems. Each additional connection of a wireless office adds an additional node to the cellular network and requires a great deal of work to update each node within the cellular network with knowledge of a new wireless office node. This work level is repeated by each wireless office that is added to the network creating a huge task for the cellular network provider.

Furthermore, when a private network is added as a node to the public access cellular telephone system, the wireless office nodes will not be owned by the cellular network providers. This raises several security concerns, and cellular network operators are not keen on adding nodes that are not under their total control. Nodes not controlled by the cellular network provider raise a serious security risk due to unscrupulous third parties access to the private nodes. Additionally, nodes not under the control of the cellular network operators may often be restarted which raises the number of management messages which must be transmitted by the network. Thus, a great many problems and concerns arise in the direct connection of a number of new wireless office nodes directly to a public access cellular network.

SUMMARY OF THE INVENTION

The present invention overcomes the foregoing and other problems with an improved communications system utilizing a network hub. A first public access cellular telephone network operates according to the signaling system no. 7 (SS7) protocol for transmitting signals between various nodes and the public access network. A second communications system comprises a TCP/IP network utilizing the TCP/IP protocol. The second network is interconnected with a plurality of private wireless networks and transmits signals via the TCP/IP protocol.

A network hub interconnects the first and second communications networks and enables the transfer of signals therebetween. The network includes processing means for converting signals from being carried by the SS7 protocol to the TCP/IP protocol and vice versa. This is accomplished by replacing the MTP and SSCP layers of an SS7 protocol signal with a TCP/IP layer for transmissions from the SS7 network to the TCP/IP network, and for replacing a TCP/IP layer with MTP and SSCP layers for transmissions from the TCP/IP network to the SS7 network.

A translation table within the network hub enables the location of mobile stations being served by wireless networks connected to the network hub to be determined. The translation table includes the mobile identification numbers of registered mobile stations. Each mobile identification number entry further includes an associated IP address for the wireless network serving the mobile station. This enables calls from the public network to be directed to the wireless office serving a mobile station. A North American Cellular Network address table provides the signaling control points (addresses) for all nodes within the public access cellular telephone network. This enables transmissions from the wireless networks to be directed to any location within the public access cellular telephone network once the communication reaches the network hub.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
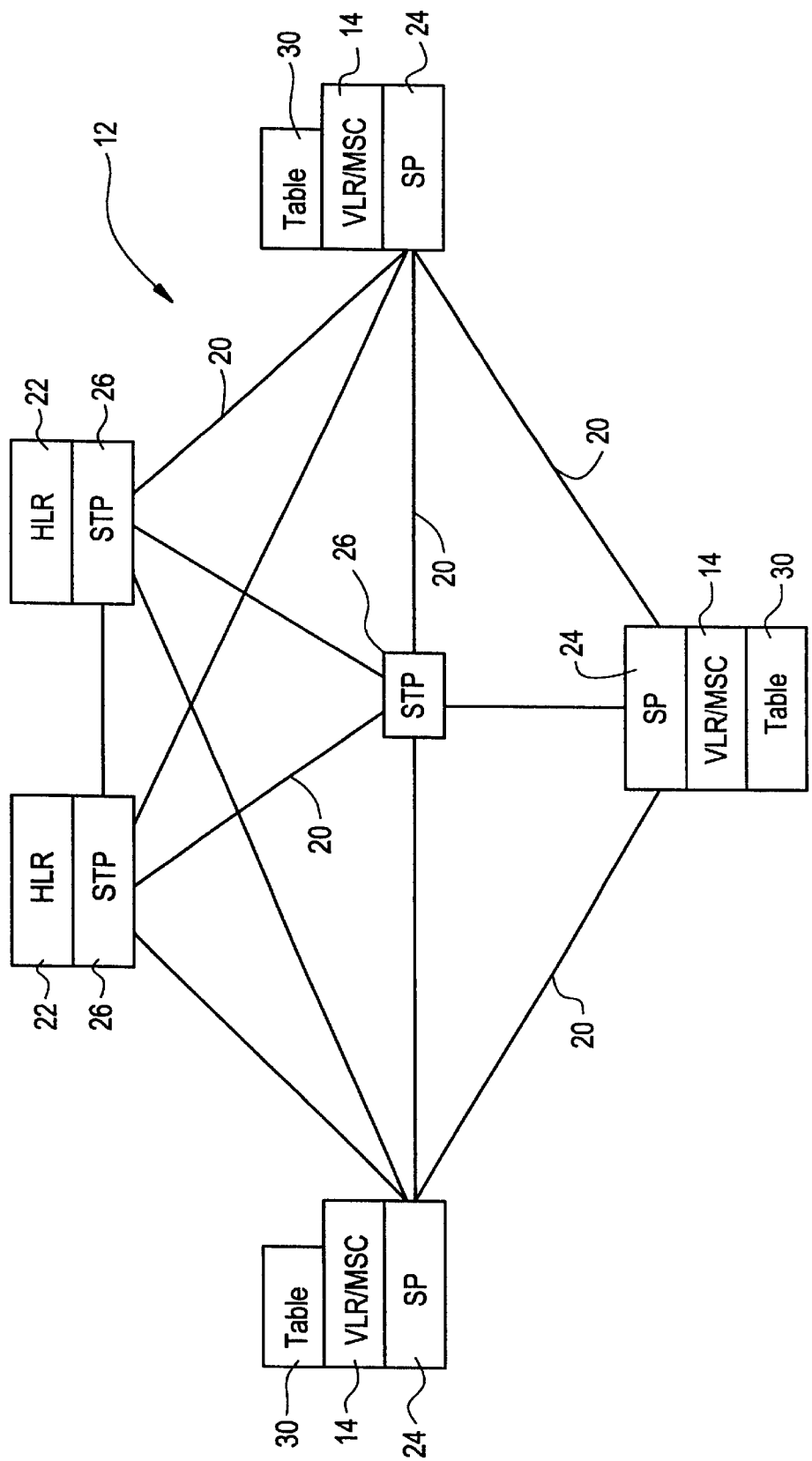
FIG. 1 is a schematic diagram of a public access cellular telephone network.

Referring now to the Drawings, and more particularly to FIG. 1, there is illustrated a schematic diagram of a public access cellular telephone network 12 (such as a known public land mobile network—PLMN). The public access cellular telephone network 12 includes a plurality of interconnected switching nodes 14 commonly referred to as mobile switching centers (PLMN-MSCs) 14. Although only three mobile switching centers 14 are shown, it will be understood that the system 12 likely includes many more interconnected nodes. The mobile switching centers 14 may comprise any one of a number of known telecommunication switching devices, including those commonly used and known in the art of providing either digital or analog cellular telephone services to a plurality of mobile stations (not shown).

The mobile switching centers 14 are interconnected with each other for communications via both voice trunks and signaling links 20 together providing a known ISUP (RI or RII) type connection. The trunks provide voice and data communication paths used to carry subscriber communications between the mobile switching centers 14. The signaling links carry command signals (such as IS-41 or other signaling system no. 7 (SS7) messages) between the mobile switching centers 14. These signals may be used, for example, in setting up and tearing down voice and data communication links over the voice trunks and controlling the provision of calling services to mobile stations.

The mobile switching centers 14 are also connected to data bases comprising a home location register (PLMN-HLR) 22 by means of signaling links 20 providing a known MAP type connection (IS-41, MAP for GSM, MAP for PDC, or other SS7 type connection). The HLRs 22 store data for each mobile station, including the location of the mobile station, which comprises a direct or indirect SS7 address (signaling point code) to the VLR (or VLR/MSC) where the mobile station last provided a registration.

Since each node is a part of the SS7 network, the nodes will further include associated signaling points (SP) 24 and signaling transfer points (STP) 26. Within an SS7 network each node essentially comprises a signaling point 24. Signaling transfer points 26 provide packet switching of IS-41 message based signaling protocols within the SS7 network.

The VLRs of FIG. 1 are illustrated as being co-located with the MSCs 14. However, it should be realized that the VLRs may comprise separate logical nodes located at a different position within the network. The VLRs includes a listing of mobile station mobile identification numbers currently registered within the service area of the associated MSC 14. For routing purposes, all of the VLRs include a table 30 of all nodes included within the network. The table 30 enables mapping of the mobile identification number (MIN) of a mobile station to the address of the HLR with which the mobile station is associated when the used mobile station registers with the VLR.

Figure 2:
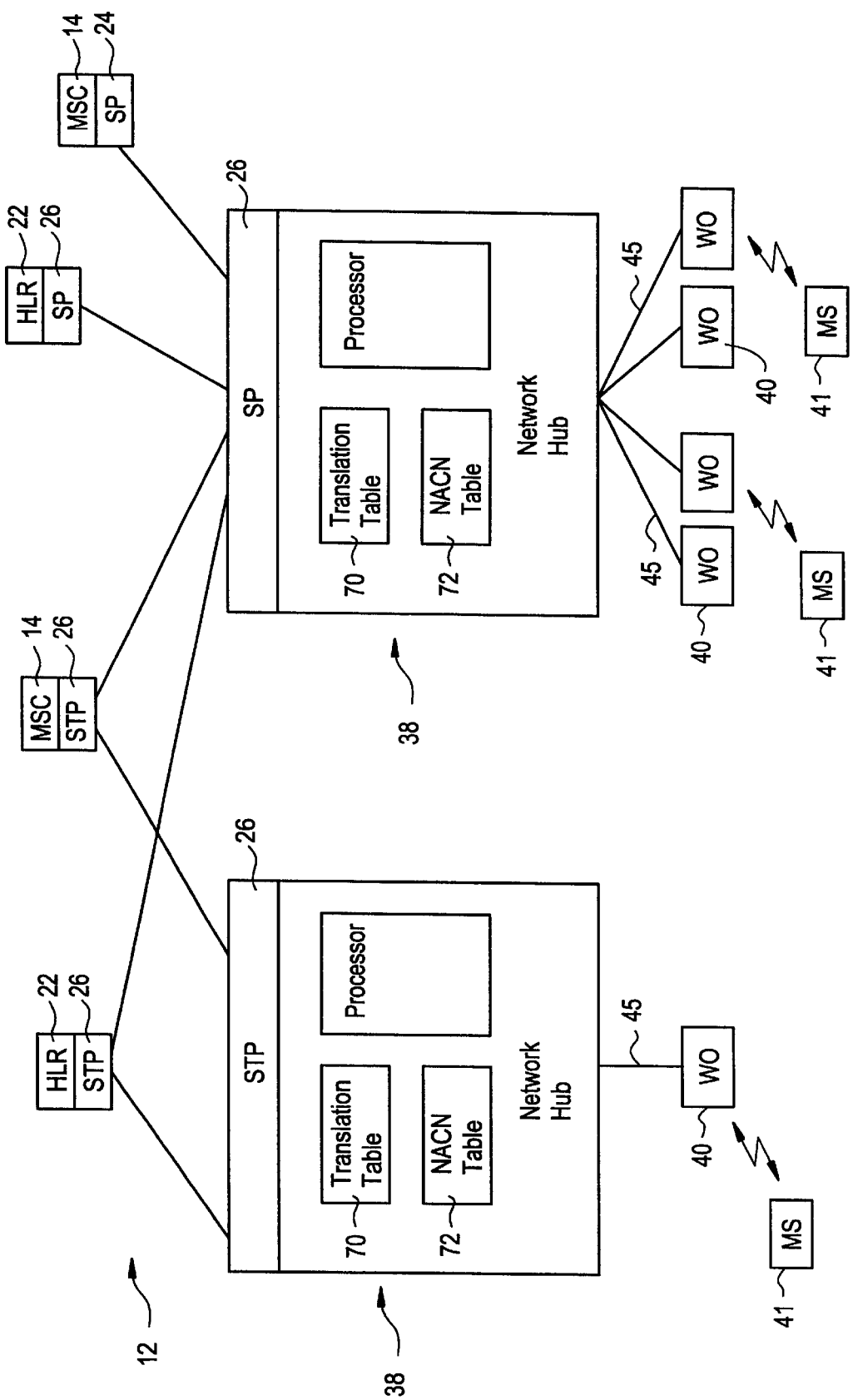
FIG. 2 is a schematic diagram of a wireless communication system including a wireless office environment private cellular telephone network, a public access cellular telephone network and a network hub for interconnecting the public and private networks.

Referring now to FIG. 2, there is illustrated the present invention wherein a network hub 38 is utilized to interconnect a public access cellular telephone network 12 with wireless office environment (private cellular telephone system) 40. The network hub 38 is capable of operating in systems using IS-41 signaling, MAP for GSM signaling, MAP for PDC signaling or other types of SS7 signaling. For purposes of discussion, the following description shall be with respect to a system using IS-41 signaling but it should be realized that the system is applicable to systems using other types of signaling. The public access cellular telephone network 12 consists of a number of mobile switching centers 14 and home location registers 22 which are interconnected with the network hub 38 via the SS7 signaling protocol links 20 and associated signaling points 25 and signaling transfer points 26 as described previously with respect to FIG. 1.

Figure 3A:
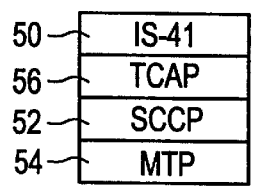
FIGS. 3a and 3b illustrate the signaling system no. 7 (SS7) protocols and TCP/IP protocols for transporting IS-41 messages according to the present invention.

Communications between the network hub 38 and the public access cellular network 12 are accomplished through the exchange of IS-41 messages 50 using well-known SS7 messaging protocols as illustrated in FIG. 3A. According to this protocol, the signal connection control part (SCCP) layer 52 is used with the message transfer part (MTP) layer 54 to route transaction capability application part (TCAP) layer 56 formatted IS-41 messages 50 from the network hub 38 to HLR 22 and MSC 14 nodes within the public access cellular telephone system 12. The TCP/IP network 45 connecting the wireless offices 40 to the network hub 38 is not capable of providing a transport medium for IS-41 messages in accordance with the SS7 messaging protocols. The SCCP layer 52 and the MTP layer 54 thus cannot be used for end-to-end routing of the TCAP layer 56 formatted IS-41 messages 50.

Figure 3B:
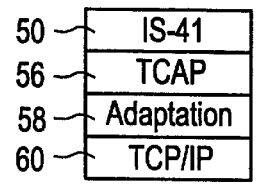

In accordance with the present invention, as illustrated in FIG. 3B, the TCP/IP layer 60 replaces the MTP layer 54 and the SSCP layer 52 of the SS7 protocol while the TCAP layer 56 remains intact for transportation of the IS-41 messages 50. To allow communications between the TCAP layer 56 and the TCP/IP layer 60, an adaptation layer 58 must exist between the TCAP layer and the TCP/IP layer. The adaption layer 58 acts as a translation interface between the different protocols. The conversion between transportation of the IS-41 messages 50 by the SS7 protocol or the TCP/IP protocol is performed by processing means within the network hub 38 and enables interconnection of the public network 12 to the wireless offices 40. The network hub 38 includes an IP address for communications using the TCP/IP protocol and a signal point code (address) for communications with respect to the SS7 protocol.

The network hub 38 further includes a translation table 70 for storing the mobile identification numbers (MIN) of mobile stations 41 being serviced by a wireless office 40 interconnected with the network hub 38. Associated with the stored MIN are the IP address of the wireless office 40 in which a mobile station is registered. The translation table 70 enables the location of mobile stations according to the IP address of its serving wireless office 40. A network table 72 (NACN) addressing table, is also included within the hub 38 and includes a listing of all nodes and signaling point codes (addresses) within the public access cellular network 12. The table 72 also includes a list of all mobile identification numbers and their corresponding HLR. The Network table 72 enables location and addressing of messages to all nodes in the public cellular telephone network 12.

As an interface between the public access cellular telephone network 12 and the wireless offices 40, the network hub 38 will include a signaling point code (address) and an IP address. Nodes within the public access cellular telephone network 12 will see the network hub 38 as a single node within the public access cellular telephone system and access the hub by the signaling point code. Thus, additions of wireless offices 40 to the hub 38 does not require additional maintenance for updating nodes within the public access telephone network 12 since the wireless office does not comprise a new node.

The network hub 38 may also include functionalities to enable restriction of the total number of active users within a wireless office or to restrict particular users from accessing a wireless office. In this manner, the network hub 38 will be able to act as a firewall between the SS7 (public) network and the wireless office (private) networks to provide security along with the reliability of the SS7 network.

While the network hub 38 within the foregoing description has been illustrated as a separate node, it should be realized that the hub is a logical node which may be physically co-located with other cellular nodes such as an HLR, VLR, MSC or a wireless office. Furthermore, while the foregoing description has been made with respect to the public access cellular system using a SS7 network, it is also possible to utilize an X.25 network in place of the SS7 network.

Figure 4:
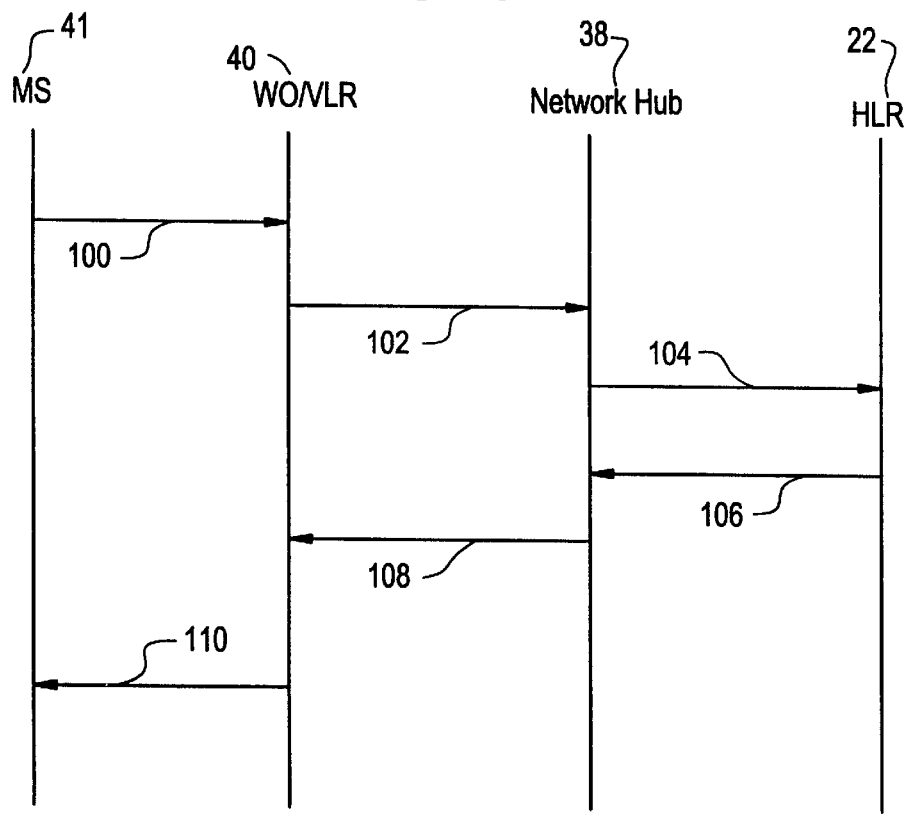
FIG. 4 is a signal flow and node operation diagram illustrating the adding of a mobile to a translation table within the network hub.

Referring now to FIG. 4, there is illustrated a signal and node diagram illustrating the process for when the Network hub 38 receives a registration of a mobile station 41 from a wireless office 40. The mobile station 41 transmits a registration message 100 to the wireless office/VLR 40 within whose service area the mobile station is currently located. The wireless office 40 forwards the registration request message 102 to the Network hub 38. In response to receipt of this message 102, the Network hub 38 adds the mobile identification number of the mobile station 41 to the translation table 70 within the hub together with the IP address of the wireless office 40 forwarding the message. The network hub 38 then utilizes the Network table 72 to determine the address of the home location register 22 (also identified in the registration request message) of the mobile station 41 and forwards the registration request message 104 to the HLR such that the location and status of the mobile station 41 may be updated by the HLR. Responses (106, 108, 110) are then returned to the network hub 38, wireless office 40 and mobile station 41.

Figure 5:
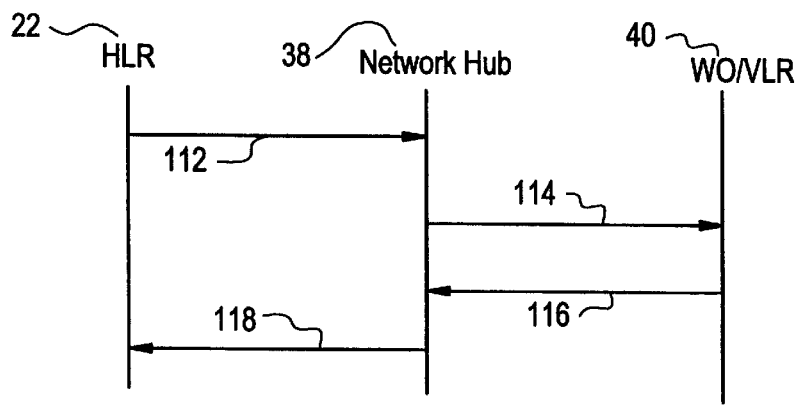
FIG. 5 is a signal flow and node operation diagram illustrating the receipt of a message from the HLR by the wireless office/VLR.

Referring now to FIG. 5, there is a signal and node diagram illustrating the receipt by the network hub 38 of a message from the HLR 22 via the SS7 network for the wireless office 40. The HLR 22 generates an IS-41 message 112 to the wireless office/VLR 40, for example, the roaming routing request message. The destination address of the roaming routing request 112 is the signaling point code (address) of the network hub 38 within the SS7 network. Upon delivery of the roaming routing request 112 to the network hub 38, the hub utilizes the mobile identification number stored within the message in accordance with IS-41 protocol standards to find the IP address of the wireless office with which the mobile station associated with the mobile identification number is registered. This is accomplished by accessing the translation table 70. The roaming routing request is then forwarded to the identified IP address at 114. The wireless office 40 provides a response to the request at 116 to the Network hub 38, and the hub 38 forwards the response to the HLR 22 at 118.

Figure 6:
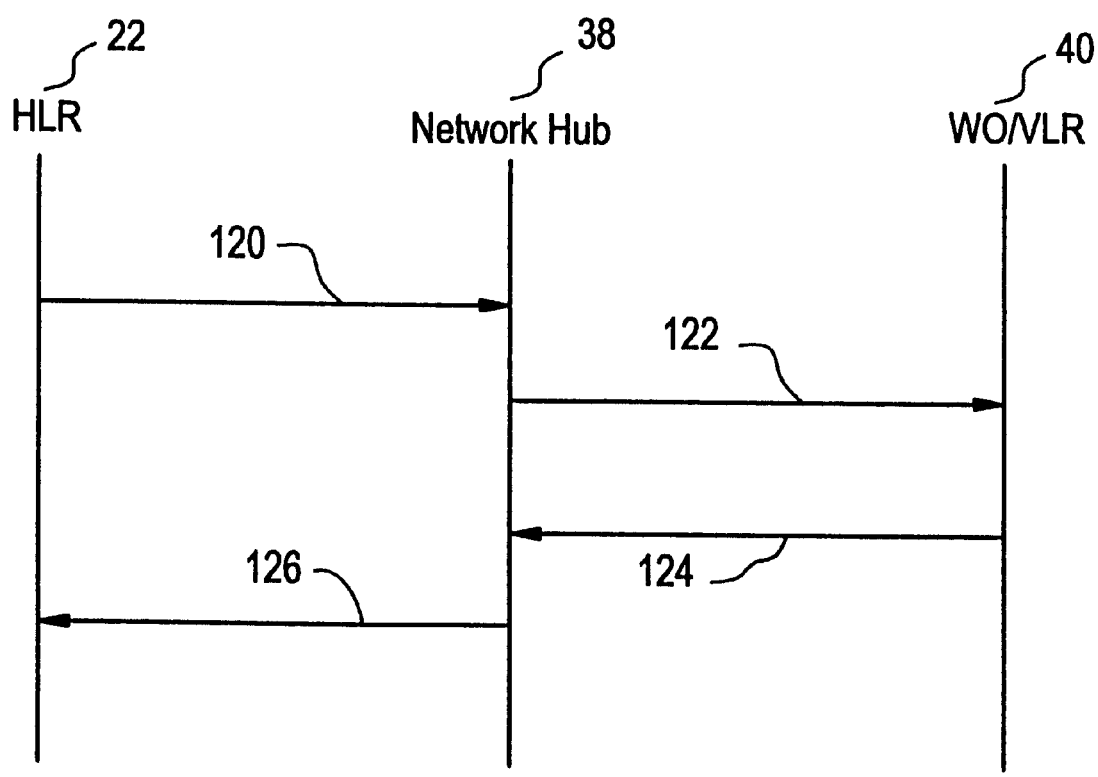
FIG. 6 is a signal flow and node operation diagram illustrating the removal of a mobile identification number from the translation table of the network hub.

Referring now to FIG. 6, there is illustrated the receipt by the network hub 38 of a message indicating that the mobile station 41 is no longer registered with the wireless office. The HLR 22 initially generates a registration cancelization message 120 to the network hub 38. At the network hub 38, the translation table 70 is utilized to find the IP address of the wireless office/VLR 40 associated with the mobile 41. The request cancellation is then forwarded to the wireless office at 122, and a response is received at 124. The network hub 38 then removes the mobile identification number for the mobile from the translation table 70 and notifies the HLR 22 of this at step 126. The network hub 38 could also remove the mobile identification number for the mobile 41 from the translation table 70, if the wireless office 40 sends an CCS-inactive message to the HLR 22. In this way, the updating of the translation table 70 is done automatically.

While the concept of the network hub 38 has been discussed with respect to the use of the hub as a bridge between an SS7 network and a wireless office, TCP/IP network, the hub could be useful in a variety of other applications. For example, the hub concept with automatic update of mobile registration is also applicable for the similar map protocols of GSM and PDC. The concept would also be useful for applications attempting to avoid the connection of several different types of small nodes, e.g., MSC/VLR to an SS7/CC7 network using an IP network. Similarly, the network hub concept would be useful for mapping between other types of protocols using E.164 type addressers (normal telephone numbers) to SS7 networks. For example, if the WO/VLR is using ISDN, the network hub 38 could provide the bridge to the cellular network with the added advantage that the HLR is unaware of the ISDN type of bearer for the WO/VLR.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A network hub, comprising:
   means for interconnecting the network hub to a first network to transceive signals via a SS7 protocol;
   means for interconnecting the network hub to at least two private wireless networks to transceive signals via a TCP/IP protocol;
   a processor for processing received signals to convert the signals between being carried by the SS7 protocol and the TCP/IP protocol;
   a translation table used in association with the processor for mapping an SS7 signaling point code of the network hub to IP addresses of the at least two private wireless networks based on a mobile identification number; and
   means for automatically updating the translation table in response to contacts involving a particular mobile identification number.

2. The network hub of claim 1 wherein the processor further replaces message transfer part (MTP) and signal connection control part (SSCP) layers of the SS7 protocol with a TCP/IP and adaptation layers for transmission from the first network to the at least two private wireless networks.

3. The network hub of claim 1 wherein the processor further replaces a TCP/IP layer with message transfer part (MTP) and signal connection control part (SSCP) layers for transmission from the at least two private wireless networks to the first network.

4. The network hub of claim 1 further including a North American Cellular Network address table associated with the processor to enable transmission to nodes within the first network from the at least two private wireless networks.

5. The network hub of claim 1 further including a translation table storing mobile identification numbers and an associated IP address for the private wireless network serving a mobile station associated with the mobile identification number for enabling transmissions from the first network to the at least two private wireless networks.

6. The network hub of claim 1 wherein the at least two private wireless networks are addressed from the first network via a single signaling point code associated with the network hub.

7. A communications system, comprising:
 a first communications network operating according to a SS7 protocol for transmitting signals;
 a second communications network operating according to a TCP/IP protocol for transmitting signals;
 a network hub for interconnecting the first communications network with the second communications network, the network hub converting received signals between being carried by the SS7 protocol and the TCP/IP protocol based upon a mobile identification number; and
 a plurality of private wireless networks connected with the second communications network, each of the plurality of private wireless networks addressed from the first network via a same destination signaling point code as the network hub.

8. The communications system of claims 7 wherein the network hub further replaces message transfer part (MTP) and signal connection control part (SSCP) layers of the SS7 protocol with a TCP/IP layer and an adaptation layer for transmission from the first network to the second network.

9. The communications system of claim 7 wherein the network hub replaces a TCP/IP layer with message transfer part (MTP and signal connection control part (SSCP) layers for transmission from the second network to the first network.

10. The communications system of claim 7 wherein the network hub further includes a translation table for mapping between SS7 signaling point codes and IP addresses.

11. The communications system of claim 10 wherein the network hub further includes means for automatically updating the translation table in response to contacts involving a particular mobile identification number.

12. The communications system of claim 7 wherein the network hub further includes a North American Cellular Network address table to enable transmission to nodes within the first network from the second network.

13. The communications system of claim 7 wherein the network hub further includes a translation table storing mobile identification numbers and an associated IP address for the wireless office serving a mobile station associated with the mobile identification number for enabling transmissions from the first network to the second network.

14. The communications system of claim 7 wherein the network hub further includes means for selecting which mobile stations may access one of the plurality of wireless networks.

15. The communications system of claim 7 wherein the network hub further includes means for limiting a total number of users which may access a wireless network.

16. A network hub, comprising:
 means for interconnecting the network hub via a first network to transceive signals via a SS7 protocol;
 means for interconnecting the network hub with a second network to transceive signals via a TCP/IP protocol, the second network further connected to a plurality of private wireless networks that are addressed from the first network via a single signaling point code associated with the network hub;
 a cellular network addressing table for locating transmission end points within the first network;
 a translation table for locating mobile stations served by the private wireless networks connected to the second network, the translation table including mobile identification numbers active within the connected private wireless networks and IP addresses for the private wireless networks where the mobile identification numbers are active; and
 a processor for processing received signals to convert the signals for carriage between the SS7 protocol and the TCP/IP protocol, the processor further configured to convert the single signaling point code of the network hub to IP addresses of the private wireless networks based on mobile identification numbers.

17. The network hub of claim 16 wherein the cellular network addressing table further includes signaling point codes for all nodes in the first network.

18. The network hub of claim 16 wherein the processor further replaces message transfer part (MTP) and signal connection control part (SSCP) layers of SS7 protocol with a TCP/IP layer and an adaptation layer for transmission from the first network to the second network.

19. The network hub of claim 16 wherein the processor further replaces a TCP/IP layer with message transfer part (MTP) and signal connection control part (SSCP) layers for transmission from the second network to the first network.

20. A network hub, comprising:
 means for interconnecting the network hub to a first network to transceive signals via a SS7 protocol;
 means for interconnecting the network hub to a plurality of cellular network nodes to transceive signals via a second protocol, each of the plurality of cellular network nodes addressed from the first network via same signaling point code as the network hub; and
 a processor for processing received signals to convert the signals between being carried by the SS7 protocol and the second protocol, the processor further configured to convert the single signaling point code of the network hub to IP addresses of the private wireless networks based on mobile identification numbers.

21. The network hub of claim 20 wherein the second protocol comprises a TCP/IP protocol.

22. The network hub of claim 20 wherein the second protocol comprises a ISDN protocol.

23. The network hub of claim 20 wherein the second protocol comprises a E.164 protocol.

* * * * *